(12) United States Patent
Liang et al.

(10) Patent No.: US 9,639,933 B2
(45) Date of Patent: May 2, 2017

(54) METHOD FOR ADAPTIVE COMPUTER-AIDED DETECTION OF PULMONARY NODULES IN THORACIC COMPUTED TOMOGRAPHY IMAGES USING HIERARCHICAL VECTOR QUANTIZATION AND APPARATUS FOR SAME

(71) Applicant: The Research Foundation for The State University of New York, Albany, NY (US)

(72) Inventors: Jerome Zheng Liang, Stony Brook, NY (US); William H. Moore, Setauket, NY (US); FangFang Han, East Setauket, NY (US); Bowen Song, Selden, NY (US); Huafeng Wang, Port Jefferson Station, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 70 days.

(21) Appl. No.: 14/767,780

(22) PCT Filed: Feb. 14, 2014

(86) PCT No.: PCT/US2014/016461
§ 371 (c)(1),
(2) Date: Aug. 13, 2015

(87) PCT Pub. No.: WO2014/127224
PCT Pub. Date: Aug. 21, 2014

(65) Prior Publication Data
US 2015/0379709 A1 Dec. 31, 2015

Related U.S. Application Data

(60) Provisional application No. 61/764,739, filed on Feb. 14, 2013.

(51) Int. Cl.
*G06T 7/00* (2006.01)
*G06K 9/46* (2006.01)
(Continued)

(52) U.S. Cl.
CPC .............. *G06T 7/0012* (2013.01); *G06K 9/46* (2013.01); *G06T 7/0081* (2013.01); *G06T 7/40* (2013.01);
(Continued)

(58) Field of Classification Search
CPC ................. G06K 9/46; G06K 2209/05; G06K 2209/051; G06K 2209/053; G06T 7/0012;
(Continued)

(56) References Cited

U.S. PATENT DOCUMENTS

| 2002/0006216 A1 | 1/2002 | Armato et al. ............... 382/131 |
| 2005/0111720 A1 | 5/2005 | Gurcan et al. ............... 382/131 |

(Continued)

FOREIGN PATENT DOCUMENTS

| JP | 2009005984 A | 1/2009 | ............... A61B 6/14 |
| KR | 1020060028044 A | 3/2006 | ............... A61B 6/03 |

OTHER PUBLICATIONS

PCT/ISA/210 Search Report issued on PCT/US2014/016461 (pp. 3).
PCT/ISA/237 Written Opinion issued on PCT/US2014/016461 (pp. 5).

*Primary Examiner* — Andrew W Johns
(74) *Attorney, Agent, or Firm* — The Farrell Law Firm, P.C.; John F. Gallagher, III

(57) ABSTRACT

Provided are an apparatus and method for fast and adaptive computer-aided detection of pulmonary nodules and differentiation of malignancy from benignancy in thoracic CT images using a hierarchical vector quantization scheme. Anomalous pulmonary nodules are detected by obtaining a
(Continued)

two-dimensional (2D) feature model of a pulmonary nodule, segmenting the pulmonary nodule by performing vector quantification to expand the 2D feature model to a three-dimensional (3D) model, and displaying image information representing whether the pulmonary nodule is benign, based upon the 3D model expanded from the 2D feature model, with duplicate information eliminated by performing feature reduction performed using a principal component analysis and a receiver operating characteristics area under the curve merit analysis. A textural feature analysis detects an anomalous pulmonary nodule, and 2D texture features are calculated from 3D volumetric data to provide improved gain compared to calculation from a single slice of 3D data.

13 Claims, 14 Drawing Sheets

(51) Int. Cl.
*G06T 7/40* (2017.01)
*G06T 7/60* (2017.01)
*G06T 11/00* (2006.01)

(52) U.S. Cl.
CPC .............. *G06T 7/60* (2013.01); *G06T 11/006* (2013.01); *G06T 2207/10081* (2013.01); *G06T 2207/20104* (2013.01); *G06T 2207/30064* (2013.01)

(58) Field of Classification Search
CPC ....... G06T 7/0079; G06T 7/0081; G06T 7/40; G06T 7/60; G06T 2207/20112; G06T 2207/30064
See application file for complete search history.

(56) References Cited

U.S. PATENT DOCUMENTS

| | | | |
|---|---|---|---|
| 2008/0012855 A1* | 1/2008 | Bi | 345/420 |
| 2009/0092300 A1* | 4/2009 | Jerebko et al. | 382/128 |
| 2009/0322748 A1 | 12/2009 | Chen et al. | 345/424 |

* cited by examiner

| $P_7$ | $P_0$ | $P_1$ |
| --- | --- | --- |
| $P_6$ | $P_c$ | $P_2$ |
| $P_5$ | $P_4$ | $P_3$ |

Binary Pattern $$\begin{aligned}LBP = & S(P_0 - P_c) \times 2^0 + S(P_1 - P_c) \times 2^1 + \\ & S(P_2 - P_c) \times 2^2 + S(P_3 - P_c) \times 2^3 + \\ & S(P_4 - P_c) \times 2^4 + S(P_5 - P_c) \times 2^5 + \\ & S(P_6 - P_c) \times 2^6 + S(P_7 - P_c) \times 2^7 +\end{aligned}$$

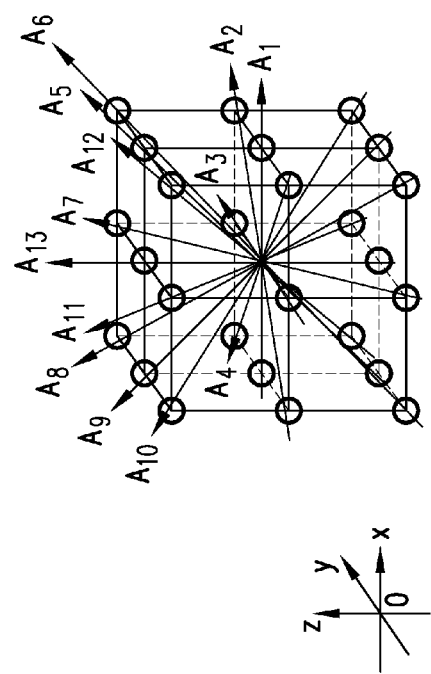
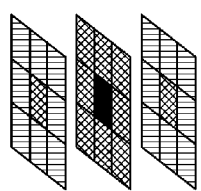
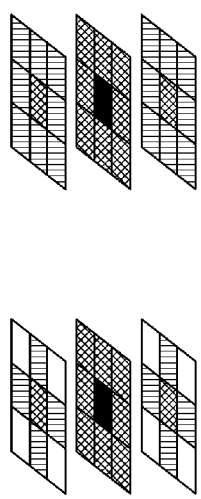
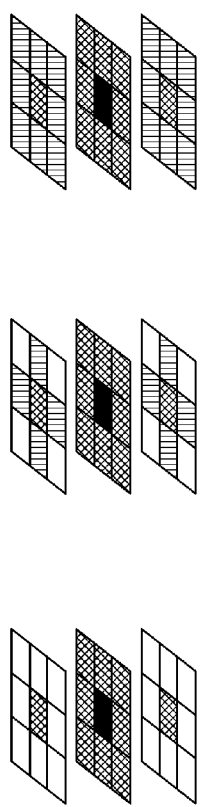
$A_1 = (0°, 0°, 0°);$
$A_2 = (45°, 0°, 0°);$
$A_3 = (90°, 0°, 0°);$
$A_4 = (135°, 0°, 0°);$
$A_5 = (0°, 0°, 45°);$
$A_6 = (135°, 45°, 135°);$
$A_7 = (135°, 45°, 135°);$
$A_8 = (135°, 45°, 135°);$
$A_9 = (0°, 90°, 135°);$
$A_{10} = (45°, 135°, 135°);$
$A_{11} = (90°, 135°, 90°);$
$A_{12} = (135°, 135°, 90°);$
FIG. 4
FIG. 5A    FIG. 5B    FIG. 5C

METHOD FOR ADAPTIVE COMPUTER-AIDED DETECTION OF PULMONARY NODULES IN THORACIC COMPUTED TOMOGRAPHY IMAGES USING HIERARCHICAL VECTOR QUANTIZATION AND APPARATUS FOR SAME

PRIORITY

This application claims priority to Provisional Patent Application No. 61/764,739 filed with the U.S. Patent and Trademark Office on Feb. 14, 2013, the contents of which are incorporated herein by reference.

GOVERNMENT RIGHTS

This invention was made with government support under grant number CA082402 awarded by the National Institute of Health. The government has certain rights in the invention.

BACKGROUND OF THE INVENTION

1. Field of the Invention

The present invention generally relates to a method for utilizing adaptive computer-aided detection of pulmonary nodules in thoracic Computed Tomography images using hierarchical vector quantization and an apparatus for same.

2. Description of the Related Art

Lung cancer remains the number one killer in all cancer related deaths in the United States. Screening of lung, i.e. pulmonary, nodules is recommended as an effective prevention paradigm. A pulmonary nodule is typically a round or oval-shaped growth in the lung, generally less than three centimeters in diameter, with a larger growth typically referred to as a pulmonary mass, which is more likely to be malignant, i.e., cancerous, rather than benign, i.e., non-cancerous.

Several conventional methods exist to perform a virtual biopsy on detected lung nodules. However, conventional virtual biopsy raises challenging issues due to, inter alia, difficulty of differentiating between malignant and benign nodules. Differentiation of malignant and benign pulmonary nodules is of paramount clinical importance for non-invasive cancer detection. Lung nodule diagnosis (CADx) based on Computed Tomography (CT) imaging has shown the potential to perform the task of differentiation. However, Computer Aided nodule Detection (CADe), of nodules from CT scans raises other challenging issues in efforts to prevent lung cancer due to the high volume of CT data that radiologists must read.

Research on the shape description and growth evaluation of nodules has generated encouraging results on tumor classification, but the results are moderate for the aspect of consideration of outside characters on the nodule surface, with shape differences research requiring more accurate segmentation of nodules, which remains a difficult topic. Another reason is waiting time for the evaluation of nodule growth, which requires an elapse of time between scans, thereby delaying potential cancer treatment. Prior research focused on shape and growth principles of pulmonary nodules to distinguish malignancy. The scant work on textural features focused on calculation of features from a gray-level co-occurrence matrix.

SUMMARY OF THE INVENTION

Accordingly, an apparatus and method is provided that provides a more efficient and safer method that exploits textural features of nodule volume data and addresses shortcomings of conventional methods and systems, to provide fast and adaptive computer-aided detection of pulmonary nodules and differentiation of malignancy from benignancy in thoracic CT images using a hierarchical vector quantization scheme with an advantage of calculating textural features in a higher dimensional space, thereby providing improved performance during classification between benign and malignant.

The present invention provides an apparatus and method to detect anomalous pulmonary nodules by obtaining a two-dimensional (2D) feature model of a pulmonary nodule, segmenting the pulmonary nodule by performing vector quantification to expand the 2D feature model to a three-dimensional (3D) model, and displaying image information representing whether the pulmonary nodule is benign, based upon the 3D model expanded from the 2D feature model, with duplicate information eliminated by performing feature reduction performed using a principal component analysis and an ROC area under the curve merit analysis. A textural feature analysis detects an anomalous pulmonary nodule, and 2D texture features are calculated from 3D volumetric data to provide improved gain compared to calculation from a single slice of 3D data.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 4 illustrates 3D resolution cells for one center voxel in thirteen directions;

FIGS. 5($a$)-($c$) showing combination modes the neighbor voxels;

DETAILED DESCRIPTION OF THE PREFERRED EMBODIMENTS

Figure 1:
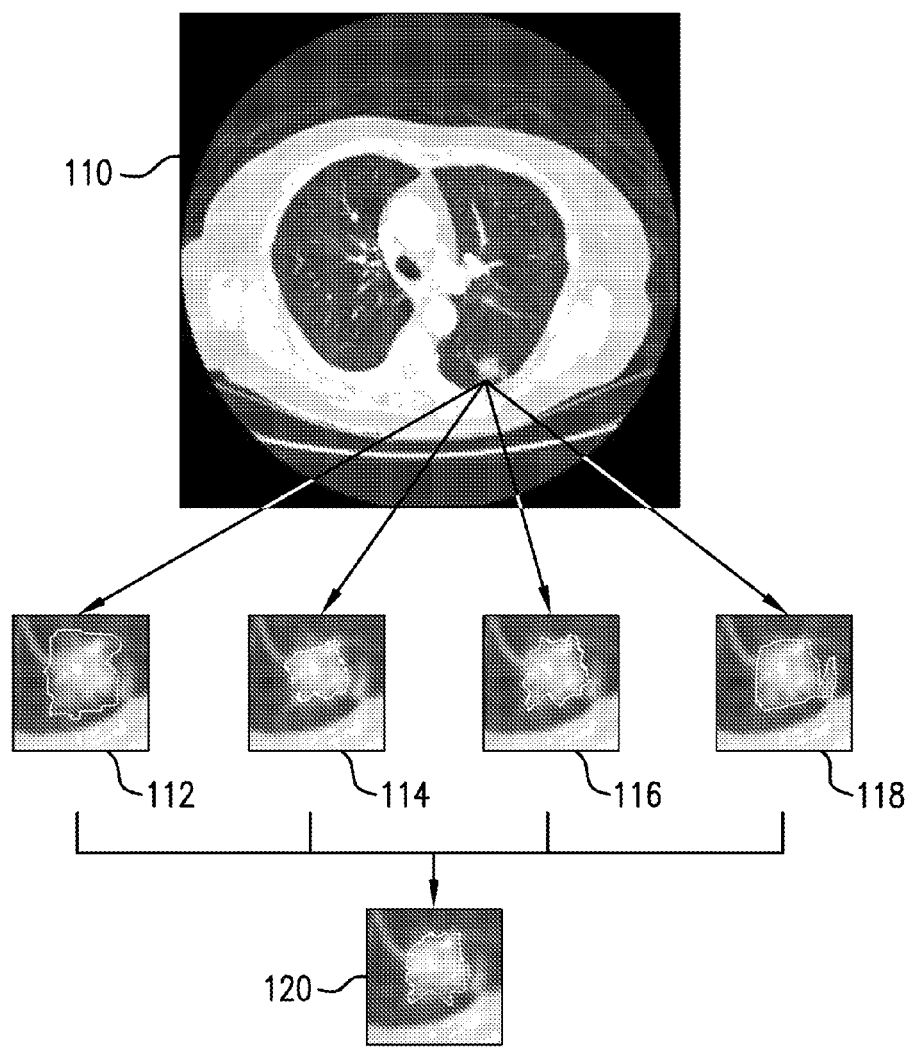
FIG. 1 illustrates combination processing of a sample nodule on a CT image.

The following detailed description of embodiments of the present invention will be made with reference to the accompanying drawings. In describing the embodiments, explanation of related functions or constructions known in the art are omitted to avoid obscuring the invention with unnecessary detail and to provide a clear understanding the invention.

Texture features of the pulmonary nodules in CT images reflect a powerful character of the malignancy in addition to the geometry-related measures. Robert M. Haralick, et al., *Textural Features for Image Classification*, IEEE Trans on Sys, Man, and Cybernetics (1973), pp. 610-621, and Dennis Gabor, *Theory of Communication*, Journal of Instit. Electr. Engineers (1946), pp. 429-457, describe study of texture features that compared three well-known types of two-dimensional (2D) texture features on CADx of lung nodules using a public database founded by the Lung Image Database Consortium and Image Database Resource Initiative (LIDC-IDRI), and investigated extension from 2D to 3D space.

The preferred embodiments used lung CT images downloaded from the Lung Image Database Consortium and Image Database Resource Initiative (LIDC-IDRI), which was initiated by the National Cancer Institute (NCI), further advanced by the Foundation for The National Institutes of Health (FNIH), and accompanied by the Food and Drug Administration (FDA). The LIDC-IDRI Database is the largest public resource of lung nodules in the world which contains 1,012 patient cases, each case includes images from a clinical thoracic CT scan and an associated XML file that records the locations of the pixels on the nodule boundary in each image slice and nine characteristics of the nodule detected by up to four experienced thoracic radiologists. The images were scanned by a wide range of different scanner manufacturers with different image slice thicknesses, such as 0.60 mm, 0.75 mm, 0.90 mm, 1.00 mm, 1.25 mm, 1.50 mm, 2.00 mm, 2.50 mm, 3.00 mm, 4.00 mm, and 5.00 mm. The LIDC-IDRI Database is becoming an essential medical imaging research resource to spur the development of computer-aided nodule detection (CADe), segmentation (CADseg), and diagnosis (CADx), validation of various proposed methodologies, and dissemination in clinical practice. According to the rules of constructing the LIDC-IDRI database, malignancy assessments are defined in five levels, 1, 2, 3, 4, and 5, from benign to malignant. Among them, '3' means the malignancy of the corresponding nodule is uncertain. Therefore, nodules with label '3' were treated in two different ways in this study: (i) they were grouped into those nodules labeled '1' and '2' as benign class; (ii) they were grouped into those nodules labeled '4' and '5' as malignant class.

To extract nodule volumes, because boundaries of each nodule on each CT slice were drawn by up to four radiologists independently, the candidate nodule volume formed by each area on each CT slice was extracted as the combinations of the up-to-four outlines with the references of the associated XML files. For the evaluation purpose, only those nodules with three or four radiologists' assessment were considered in the following. The combination rule of the four outlines for each slice of each nodule is to extract all image pixels inside their painting boundaries and select the intersection area of at least three radiologists' decisions as the nodule's region in an image slice. Stocking those associated image slices together gives the nodule volume. Table 1 sets forth steps outlining extraction of nodule volume data.

TABLE 1

Nodule Volume Extraction

1) Read all the pixels belong to the four boundaries of each nodule.
2) Fill the inner pixels for each of the four boundaries.
3) Calculate the times ($t_n$) of each pixel being contained by the four boundaries.
4) Label the inner pixels by combination times.
   If ($t_n \geq 3$)
      The pixel is labeled.
5) Combine all the labeled pixels, and then extract the nodule volume data from the CT images according to their spatial coordinates.

FIG. 1 provides an example of the combination processing of a sample nodule on a CT image 110, with radiologists 1-4 providing drawings 112, 114, 116 and 118, respectively, and combined result 120.

After determining nodule volume from radiologists' drawings 112-118, the volume is translated into a corresponding image volume using an associated annotation file, "imageZposition", which is included in XML files, which is part of the LIDC database, to provide slice information where each nodule's boundaries were drawn by the radiologists. Once the volume of a nodule was identified in the corresponding image volume, the image volume data of that nodule was then obtained. As discussed below, various geometric and texture features are extracted from the image volume of a nodule.

Three types of widely-used 2D texture features, i.e., Haralick, Gabor, and LBP, as discussed below, exist, with related calculation methods. Expansion to 3D space is described using the 2D Haralick feature type as an example, where the reduction of feature size or dimension is illustrated by the Principal Component Analysis (PCA). 2D Haralick features calculation method is based on the Gray-Tone Spatial-Dependence Matrices (GTSDMs); 2D Gabor features calculation is based on Gabor filters; calculation of statistical Local Binary Pattern (LBP) features is expressed by the local binary patterns; 3D Haralick features calculation methods are based on the 3D GTSDMs; and PCA algorithm is applied on 2D and 3D Haralick features.

Feature extraction based on 2D Gray-Tone Spatial-Dependence Matrices assumes that the texture information of a nodule is contained in an extracted nodule image volume I. In other words, the texture information can be adequately specified by a set of GTSDMs, which are computed for various angular relationships and distances between neighboring resolution cell pairs on each of the image slices. Then the texture features are calculated from the analyzed statistics or pattern matrices. There are two steps to obtain the texture features using this method, i.e., (i) generation of the GTSDMs and (ii) feature extraction from these matrices, with the algorithm of extracting the texture features outlined in Table 2.

TABLE 2

2D Haralick Features Calculation

1) Quantize a gray value of each pixel to $N_g$ levels.
2) Generate the pattern matrices on all of the four directions, 0°, 45°, 90°, and 135°.
3) Calculate 14 Haralick features from each pattern matrix on each direction separately for four directions in total.
4) Calculate the mean and range of each feature over the four directions.

In regards to the algorithm outlined in Table 2, the image to be analyzed is presented in rectangular form in a 2D representation, with Nx×Ny resolution, and gray value of each image pixel quantized into Ng levels, distance of neighbor points on each direction of 1 pixel unit. For each pixel in the image, correlations between the eight neighbor pixels and itself are described in four directions, such as 0°, 45°, 90°, and 135°, as illustrated in FIG. 2.

Figures 2, 3:
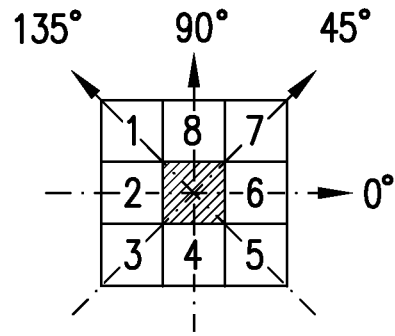
FIG. 2 illustrates correlations between eight neighbor pixels in four directions.
FIG. 3 illustrates an LBP operator and LBP features for a neighborhood of eight pixels.

As shown in FIG. 2, pixels 2 and 6 are 0° nearest neighbors to a central pixel *; pixels 3 and 7 are 45° nearest neighbors; pixels 4 and 8 are 90° nearest neighbors; and pixels 1 and 5 are 135° nearest neighbors. A GTSDM is calculated for each direction according to gray value combinations of neighbor and central pixels, as shown in Table 3, which provides a general form of any GTSDM for any direction, with # (i, j) (i, j=0, 1, 2, . . . , Ng) standing for number of times gray tones i and j have been as neighbors, therefore, the resolution of each GTSDM is Ng×Ng.

TABLE 3

| Gray level | 0 | 1 | 2 | ... | $N_g$ |
|---|---|---|---|---|---|
| 0 | #(0, 0) | #(0, 1) | #(0, 2) | ... | #(0, $N_g$) |
| 1 | #(1, 0) | #(1, 1) | #(1, 2) | ... | #(1, $N_g$) |
| 2 | #(2, 0) | #(2, 1) | #(2, 2) | ... | #(2, $N_g$) |
| ... | ... | ... | ... | ... | ... |
| $N_g$ | #($N_g$, 0) | #($N_g$, 1) | #($N_g$, 2) | ... | #($N_g$, $N_g$) |

A basic assumption in the above extraction method is that all the texture information is contained in gray-tone spatial-dependence matrices. Therefore, all textural features can be extracted from the matrices. A set of 14 measures of texture features are usually calculated, such as angular second moment, contrast, correlation, sum of squares (variance), inverse difference moment, sum average, sum variance, sum entropy, entropy, difference variance, difference entropy, information measures of correlation, and maximal correlation coefficient. The formulas of these texture features have been given by R. Haralick, et al., *Textural Features for Image Classification*, IEEE Trans. on Sys., Man, and Cybernetics, (November 1973), SMC-3(6): 610-621, i.e., the Haralick features, with 14 features on each direction.

After the feature values are calculated along all four directions, the mean and range of each feature is averaged over the four directions, resulting in a set of 2×14 features in total to classify each nodule. In the preferred embodiments of the present invention, the 2D Haralick features were extracted according to two different rules, (1) from the single CT image slice which contains the largest area of the candidate nodule, and (2) from all the CT image slices which contain the parts belonging to the candidate nodule.

Feature extraction based on Gabor filters is based on Gabor functions, proposed in 1946 by Dennis Gabor for communications applications. See D. Gabor, *Theory of Communication*, Journal of Institution of Electr. Engineers, 93(26), pp. 429-457 (1946). Gabor functions have since been deployed in many areas of signal processing, typically for multi-dimensional signal processing applications, with Gabor filters recently becoming widely used as a texture feature extractor. See J. Kamarainen, et al., *Invariance Properties of Gabor Filter-Based Features-Overview and Applications*, IEEE Trans. on Image Processing, 15(5), pp. 1088-1099 (2006). A Gabor filter is obtained by modulating a sinusoid with a Gaussian functional and further being discretized over orientation and frequency. See, P. Kruizinga, et al., *Comparison of Texture Features Based on Gabor Filters*, Proc. of 10th Int'l Conf. on Image Anal. and Processing, Venice, Italy, pp. 142-147.2D (1999). Gabor filters can be defined as follows in the spatial domain (x, y) according to Equations (1)-(3):

$$g(x, y; \lambda, \theta, \varphi, \sigma, \gamma) = \exp\left(-\frac{x'^2 + \gamma^2 y'^2}{2\sigma^2}\right)\exp\left(i\left(2\pi\frac{x'}{\lambda} + \varphi\right)\right) \quad (1)$$

$$x' = x\cos\theta + y\sin\theta \quad (2)$$

$$y' = -x\sin\theta + y\cos\theta, \quad (3)$$

where the arguments x and y specify the position of a light impulse in the visual field, $\lambda$, $\theta$, $\varphi$, $\sigma$ and $\gamma$ are parameters thereof. See, N. Petkov, et al. *Computational Models of Visual Neurons Specialised in the Detection of Periodic and Aperiodic Oriented Visual Stimuli: Bar and Grating Cells*, Biological Cybernetics (76), pp. 83-96 (1997). $\lambda$ represents the wavelength of the sinusoidal factor, and the spatial frequency can be shown as $1/\lambda$. $\theta$ ($\theta \in [0,\pi)$) represents the orientation of the normal to the parallel stripes of a Gabor function. $\varphi$ ($\varphi \in (-\pi,\pi]$) is the phase offset. Since the nodules are usually circular-shaped, the preferred embodiment utilized $\varphi=0$ for symmetric receptive fields. $\sigma$ is the sigma parameter of the Gaussian envelope, which can be determined by $\lambda$. $\sigma/\lambda$ is a constant value empirically set, and then a can be determined by $\lambda$. $\gamma$ is the spatial aspect ratio that specifies the ellipticity of the support of the Gabor function, which has been found to vary in a limited range of $0.23 < \gamma < 0.92$. See, J. Jones, et al., *An Evaluation of the Two-Dimensional Gabor Filter Model of Simple Receptive Fields in Cat Striate Cortex*, Journal of Neurophysiology, Vol. 58, pp. 1233-1258 (1987), which used 0.92 as a value of $\gamma$. Finally, only parameters $\theta$ and $\lambda$ are used to index a Gabor filter function.

The response of a Gabor filter to an image is obtained by a 2D convolution operation. An input image I(x,y), x, y∈Ω, (Ω—the set of image points) is convolved with a 2D Gabor function, g(x, y, $\lambda$, $\theta$, $\psi$, $\sigma$, $\gamma$), x, y∈Ω, to obtain a Gabor feature image r(x,y) according to Equation (4):

TABLE 4

Gabor Features Calculation

1) Input 2D image slices of the candidate nodule.
2) Set parameters $\theta$ (0°, 45°, 90°, and 135°) and 1/$\lambda$ (0.3, 0.4, and 0.5) of Gabor filters.
3) Get the response images from the convolution of 2D images and each Gabor filter separately.

TABLE 4-continued

Gabor Features Calculation

4) Calculate the mean and standard deviation values of response images for the candidate nodule according to each Gabor filter.

Accordingly, parameter values (orientation θ=0°, 45°, 90°, 135° and frequency 1/λ=0.3, 0.4, 0.5) were adopted according to the experiences referred to by D. Zinovev, et al., *Predicting Radiological Panel Opinions Using a Panel of Machine Learning Classifiers*, Algorithms, Vol. 2, pp. 1473-1502 (2009). As mentioned by D. Zinovev, et al., the mean and standard deviation of each Gabor response image were calculated to be the features for the desired classification purpose, accordingly to the feature extraction algorithm of Table 4.

$$r(x, y) = \int\int_\Omega I(\xi, \eta)g(x-\xi, y-\eta; \lambda, \theta, \psi, \sigma, \gamma)d\xi d\eta \quad (4)$$

In regards to feature extraction based on local binary patterns, as a model of texture analysis based on the so-called texture unit, Local Binary Pattern (LBP) was first introduced in L. Wang, et al., *Texture Classification Using Texture Spectrum*, Pattern Recognition, Vol. 23, pp. 905-910 (1990) and T. Ojala, et al., *A Comparative Study of Texture Measures with Classification Based on Feature Distributions*, Pattern Recognition, Vol. 29(1), pp. 51-59 (1996), with a main idea that a texture image can be characterized by its texture spectrum in the image. The LBP calculates relationships between each neighborhood pixel and the central one, and describes textures based on the histogram of the whole region of interest. Because of the advantage on the powerful illumination invariant, LBP has been widely recognized as a texture operator. This LBP texture operator has been highly successfully used for various computer vision applications, especially for face recognition. See, T. Ahonen, et al., *Face Description with Local Binary Patterns: Application to Face Recognition*, IEEE Transactions on Pattern Analysis and Machine Intelligence, Vol. 28(12), 2037-2041 (2006).

Many favorable patterns were proposed based on different numbers of neighborhood pixels with different radii around the central pixel. However, the basic LBP operator introduced as a standard example, used mostly in practices is based on the eight neighbor pixels. See, M. Heikkilä, et al., *Description of Interest Regions with Local Binary Patterns*, Pattern Recognition, Vol. 42(3), pp. 425-436 (2009).

FIG. 3 illustrates the basic LBP operator and typical LBP features based on a neighborhood of eight pixels, and shows relationships of the central pixel $P_c$ and surrounding pixels $P_n$ (n=0, 1, . . . , 7) on gray levels, calculated by Equation (5):

$$s(x) = \begin{cases} 1 & x \geq 0 \\ 0 & \text{otherwise} \end{cases}, \quad x = P_n - P_e. \quad (5)$$

If the gray value of a neighbor pixel is higher than or equal to that of the central one, the value of s(x) is set to one, otherwise to zero. The descriptor describes the result over the neighborhood as a binary pattern by Equation (6):

$$LBP_{R,N}(x, y) = \sum_{i=0}^{N-1} s(P_i - P_c) \times 2^i, \quad (6)$$

where N is equal to eight in this illustrative example, $P_c$ value corresponds to the gray value of the central pixel of a local neighborhood, and $P_i$ to the gray values of N equally spaced pixels on a circle of radius R. Therefore, the signs of the differences in a neighborhood are interpreted as an N-bit binary number, resulting in $2^N$ (e.g., $2^8$=256) distinct values for the binary pattern. However, many images of a nodule or other objects cannot contain all 256 patterns. Therefore, the selection of effective patterns should be adopted in most applications, with the feature extraction algorithm outlined in Table 5.

TABLE 5

LBP Features Calculation

1) Input 2D image slices of the candidate nodule.
2) Calculate eight patterns of each pixel in one 2D image except the boundary points (the boundary points are not belong to the candidate nodule).
3) Calculate the statistical probabilities of each pattern in the whole 2D image.
4) Summarize the statistical probabilities of each pattern on all of the images containing the current nodule as LBP feature candidates.

In regards to expansion of Haralick feature models on gray-tone spatial-dependence matrices, while 2D medical images of axial cross-section can always give rich information for various clinical tasks, there is a conjecture that more information can be obtained in 3D image space. Therefore, the 3D texture features extracted from the 3D volume nodule data were considered. As an example, the preferred embodiments include a calculation model based on the 2D model to obtain the 3D Haralick features. See, C. Philips, et al., *An Analysis of Co-Occurrence and Gabor Texture Classification in 2D and 3D*, CARS 2008 Proceedings. Barcelona, Spain; G. Zhang, et al., *CAD Based on 3D Texture Analysis for Virtual Colonoscopy*, The 22nd International Congress and Exhibition, CARS 2008 Computer Assisted Radiology and Surgery, Jun. 25-28, 2008, Barcelona, Spain: 17; F. Han, et al., *A New 3D Texture Feature Based Computer-Aided Diagnosis Approach to Differentiate Pulmonary Nodules*, Proc. SPIE 8670, Medical Imaging 2013, Computer-Aided Diagnosis, 86702Z.

FIG. 4 shows 3D resolution cells for one center voxel in thirteen directions, with angular Ai (i=1, 2, . . . , 13) being equal to (θxy, θyz, θxz), with θxy as the angle between the project vector on x-y flat and x axis, θyz as the angle between the project vector on y-z flat and y axis, and θxz as the angle between the project vector on y-z flat and z axis.

The preferred embodiments regard, as an integral part thereof, the volume as a structure which consists of many spatial texture elements. Following the same calculation procedure as that on 2D image, the calculation model of Haralick features is applied to 3D gray-level volume data. In 2D images, there are eight neighbor pixels around the central one with the distance of one pixel. In 3D space, each voxel has 26 neighbors with distance of one voxel (d=1). Therefore, there are 13 directions in the 3D model, as shown as in FIG. 4, for calculation of the Haralick features. For each direction, fourteen texture features can be calculated from the corresponding GTCM. Therefore, more directions and space information are considered.

To study the contributions of different directions for the classification of lung nodules, we designed three different combination modes of directions, which contain 5, 9, and 13 directions respectively. The standard rule for different combinations of 3D directions is based on the spatial distances between the neighboring voxels and the central one. The first combination contains $A_1$, $A_2$, $A_3$, $A_4$, and $A_{13}$, the second combination contains $A_1$, $A_2$, $A_3$, $A_4$, $A_5$, $A_7$, $A_9$, $A_{11}$, and $A_{13}$, and the third combination contains all of the thirteen directions shown in FIG. 4.

A schematic diagram of three combinations of directions studied in a preferred embodiment is provided in FIGS. 5(a)-(c) showing combination modes of the neighbor voxels on 3D directions, with FIG. 5(a) showing a combination of five directions, FIG. 5(b) showing a combination of nine directions, and FIG. 5(c) showing a combination of thirteen directions.

In regards to FIGS. 5(a)-(c), suppose $H_{ij}$ is the jth (j=1, 2, ..., 14) texture feature value in the ith direction (i=1, 2, ..., n, n=5, 9, 13) calculated from the GTCMs proposed by Haralick, the final Haralick features should be 2×14=28 which contain the mean and range of the texture feature values on the directions of different combination modes, according to Equations (7)-(8):

$$Mean_{jn} = \frac{1}{n}\sum_{i=1}^{n} H_{ij} \quad (7)$$

$$Range_{jn} = \max_{i=1 \ldots n}\{H_{ij}\} - \min_{i=1 \ldots n}\{H_{ij}\}. \quad (8)$$

However, the physical distance between the neighbor voxels along z axis is usually different from x and y axis. Therefore, when we use the 3D Haralick feature model, we should pay attention to the different physical distances of neighbor voxels along different axis. See, F. Han, et al. If the volume data is anisotropic, a re-sampling operation may be needed, with an outline of calculating 3D Haralick features provided in Table 6.

TABLE 6

3D Haralick Features Calculation

1) Resample the anisotropic volume data to isotropic one.
2) Quantize the gray value of each pixel to $N_g$ levels.
3) Generate the GTCMs on all of the thirteen directions in the 3D volume model.
4) Calculate 14 Haralick features from each GTCM on each direction separately for the thirteen directions in total.
5) Calculate the mean and rang of each feature over the five, nine, and thirteen directions.

In regards to principal component analysis on the Haralick feature vector space, after calculation of the Haralick features, each sample has a feature vector containing 28 factors. When combining the texture features to other features (size, shapes, etc.), the dimension of the texture feature vector, however, can be very large. The PCA algorithm is a mathematical procedure that uses orthogonal transformation to convert a set of observations of possibly correlated variables into a set of values of linearly uncorrelated variables called principal components, see, H. Abdi, et al., *Principal Component Analysis*, Wiley Interdisciplinary Reviews: Computational Statistics, Vol. 2, pp. 433-59 (2010), which was used to reduce the number of texture features without much efficiency reduction. Another application is provided by C. Philips, et al., *Directional Invariance of Co-Occurrence Matrices within the Liver*, International Conference on Biocomputation, Bioinformatics, and Biomedical Technologies, pp. 29-34 (2008).

For n samples, resolution of the feature matrix formed by the feature vectors is n×28. According to the principle of PCA algorithm, see H. Abdi, feature vectors in the feature matrix are transformed to an equal number of principal components and the corresponding scores. The scores and corresponding principal components are ranked based on the values of scores decreasingly. The cumulative energy content of the i-th (i=1, 2, ..., 28) component is the sum of the former i scores divided by the sum of all scores. Principal components are then selected as the new feature vectors by the firstly setting of the cumulative energy content. The preferred embodiments allow for improved evaluation and efficiencies of different texture features for classification of malignant and benign lung nodules. For purposes of experimental verification, the entire LIDC database, which is so far the largest public database available, was utilized. While all images were acquired with equal pixel size in each image slice, the image thickness varies depending on data acquisition protocols. Investigation on the dependence of the features on the image thickness is one task of this work. As described above, in the LIDC-IDRI database, the radiologists' malignancy assessments are labeled as '1', '2', '3', '4' and '5' levels.

Figure 6:
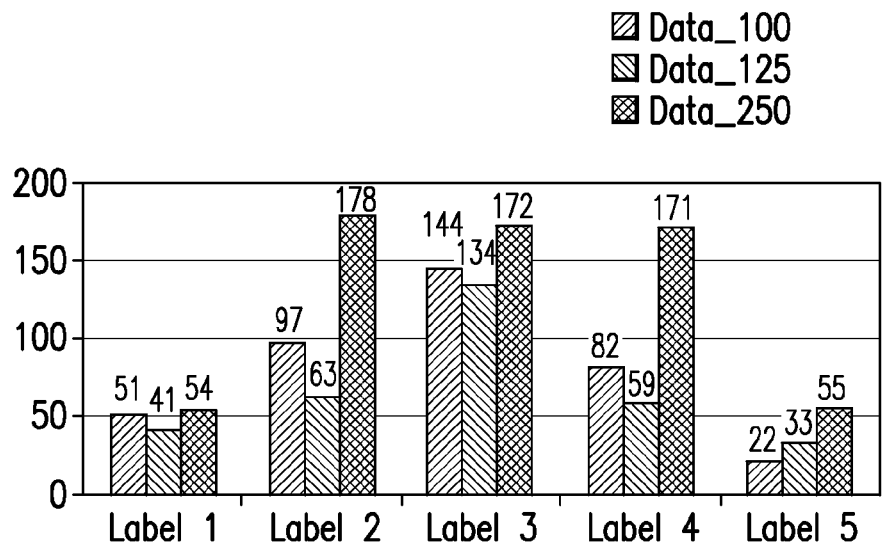
FIG. 6 is a bar chart summarizing class label and image thickness information in the conventional LIDC-IDRI database.

FIG. 6, which provides information about class labels and image thickness in the LIDC-IDRI database used in the study of the preferred embodiments, shows the nodules (diameter>3 mm) of the database in terms of image thickness and class labels that were used in the experimental data, with the vertical axis showing the number of nodules.

In the experimental study, '1' and '2' are grouped as benign class, '4' and '5' as malignant class, and '3' as uncertain class. The label '3' or uncertain class is treated in two different scenarios. In the first scenario, '3' was grouped into benign class. In the second scenario, '3' was grouped into malignant class.

By inputting the extracted features from the 1,356 nodules (of three thickness groups) and the labels of two classes (1=malignance and 0=benign) into the well-known Support Vector Machine (SVM) with the widely-used kernel of Radial Basis Function (RBF), see J. Suykens, et al., *Least Squares Support Vector Machine Classifiers*, Neural Processing Letters, June 1999; 9(3), pp. 293-300, the training and testing process was randomized for 100 times. The corresponding 100 classification outcomes of sensitivity and specificity were obtained. From each set of 100 classification outcomes of an image slice thickness, the mean and standard deviation measures were computed. Design of preferred embodiments and experimental outcomes are as follows.

Figure 12:
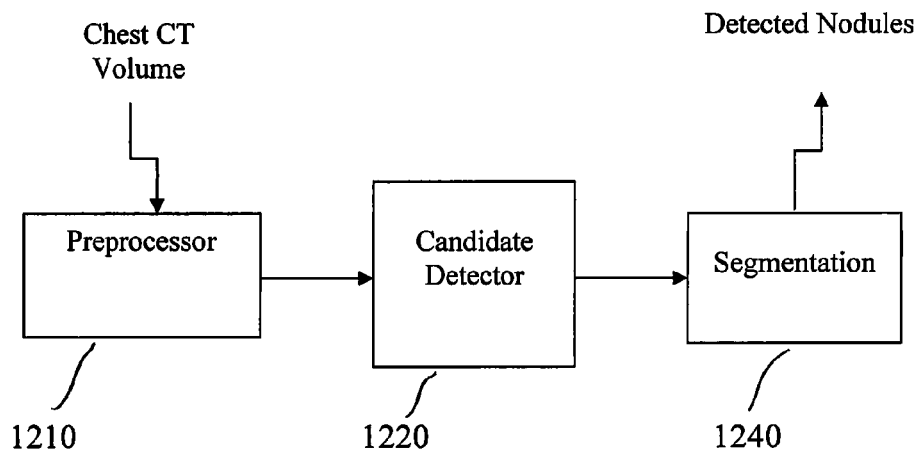
FIG. 12 is a block diagram of upper level components of the apparatus for computer-aided detection (CADe) or segmentation of pulmonary nodules, according to an embodiment of the present invention.

For comparison of three types of 2D texture features based on different slice thicknesses, based on the above description of the three texture features, 28 Haralick features, 24 Gabor features, and 256 LBP features were extracted from the segmented volume data of each nodule. In extracting the Haralick features, 14 measures of the four directions (0°, 45°, 90°, 135°) were calculated, but the feature values of the maximal correlation coefficient extracted from our nodule cases were always zero or very close to zero. Therefore, there were 13 measures left which can be evaluated on each direction in this study. Then the Haralick features were presented by the mean and range values of the 13 measures over the four directions, resulting in a total of 26 features (i.e., 13×2). For the parameters of Gabor filters, the same directions were selected as mentioned above of 0°, 45°, 90° and 135° and the frequencies of 0.3, 0.4 and 0.5, resulting in a total of 24 features. By theory, a total of 256 LBP features would be extracted. However, in this situation, most of the feature values were zero, indicating that most patterns are not existed in the nodule CT images. All of the features were undergone a principal component analysis and 0.9985 of cumulative probability was empirically selected, resulting in 40±5 LBP features as input to a SVM classifier 1240 (FIG. 12).

A first experiment was performed on the original data of different image slice thicknesses. Three image groups were selected from the LIDC-IDRI database: Group #1 (Data_250) has 630 nodules of 2.50±0.50 mm image thickness, Group #2 (Data_125) has 330 nodules of 1.25 and 1.50 mm thickness, and Group #3 (Data_100) has 396 nodules of 1.00 mm thickness or less. Those nodules of image thickness beyond 4.00 mm were ignored.

Figure 7A:
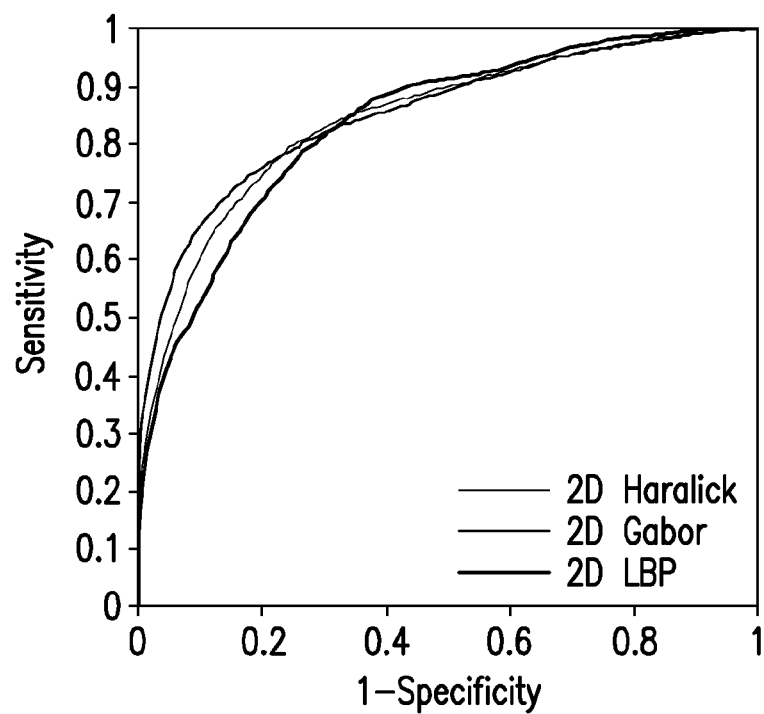
FIGS. 7($a$)-($c$) provide Receiver Operating Characteristic (ROC) curves for texture features classification performance for three groups of different image thickness nodule data, according to an embodiment of the present invention.
Figure 7B:
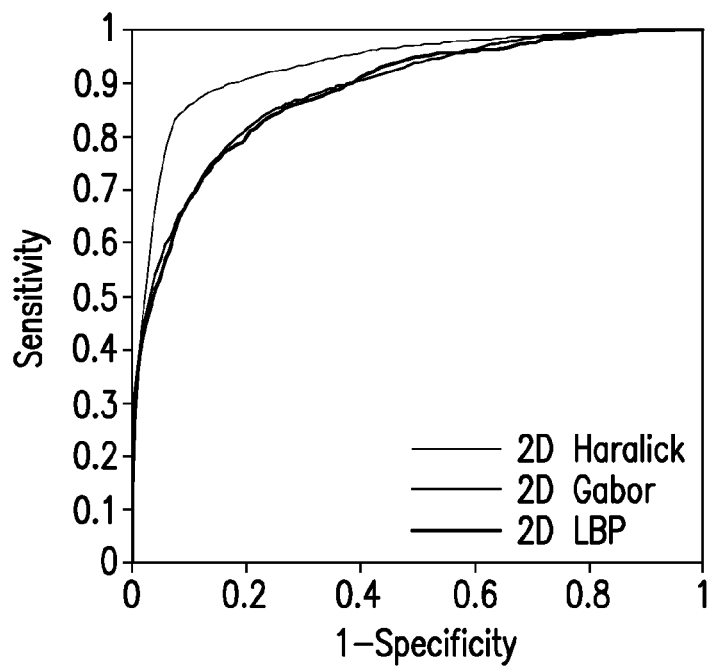
Figure 7C:
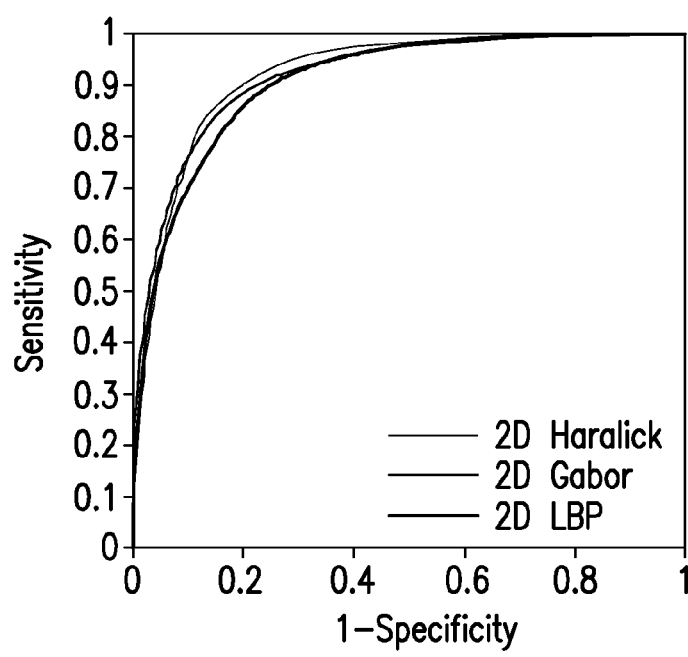

The outcome from the first scenario, where the label '3' was grouped into benign class, is shown by FIGS. 7(*a*)-(*c*), providing ROC curves of three types of texture features' classification performance on the three groups of different image thickness nodule data. FIG. 7(*a*) shows ROC curves of three types of features applied on the nodule data with 1.00 mm or less slice thickness. FIG. 7(*b*) shows ROC curves of three types of features applied on the nodule data with 1.25 and 1.50 mm slice thickness. FIG. 7(*c*) shows the ROC curves of three types of features applied on the nodule data with 2.50±0.50 mm slice thickness. Each ROC plot was drawn from the SVM classification of the features from all the nodules. The mean and standard deviation (SD) values of the Area Under the ROC Curve (AUC) measures are shown in Table 7, which provides AUC information about performances of the three types of texture features.

TABLE 7

| | AUC Information | | | | | |
|---|---|---|---|---|---|---|
| | Haralick Features | | Gabor Features | | LBP Features | |
| | Mean | SD | Mean | SD | Mean | SD |
| Data_100 | 0.8393 | 0.0491 | 0.8485 | 0.0413 | 0.8321 | 0.0230 |
| Data_125 | 0.9270 | 0.0257 | 0.8805 | 0.0437 | 0.8779 | 0.0232 |
| Data_250 | 0.9160 | 0.0150 | 0.9139 | 0.0116 | 0.9022 | 0.0171 |
| Average | 0.8941 | 0.0299 | 0.8810 | 0.0322 | 0.8707 | 0.0211 |

A high effectiveness of the three types of 2D texture features on the classification of malignancy can be visualized in FIGS. 7(*a*)-(*c*), and also reflected by the average mean and standard deviation values of the AUC measures as listed in Table 7. The classification results from the Haralick features show significantly higher AUC values on average on Data_125 group (t-test p-value$_{HG}$=1.1102×10$^{-16}$, p-value$_{HL}$=5.6431×10$^{-32}$) and Data_250 group (t-test p-value$_{HG}$=0.2601, p-value$_{HL}$=6.3565×10$^{-9}$) than that of the Gabor and LBP features. For Data_100 group, all three types of features showed similar performance. Because of the large database and 100 repeated runs, the above experimental outcome would lead to the following conclusion. While the three types of texture features performed similarly for noisy data (thinner image slices), the Haralick features outperformed the other two types as the image noise level goes down (thicker image slices). When the image slice thickness goes beyond 3.0 mm, image details along the slice direction will be averaged out and the details in the axial cross section will be affected by partial volume effect, no obvious gain is expected, as demonstrated by the outcome from the Haralick features. To further investigate the influence of image slice thickness on the classification performance, a further experiment was conducted, as discussed below.

To compare different 2D texture features after thickness interpolation, an experiment was performed by interpolating the thick images to a same thinner thickness, with the interpolation method referring to a cubic interpolation algorithm mentioned. See F. Fritsch, et al., *Monotone Piecewise Cubic Interpolation*, Society for Industrial and Applied Mathematics, 1980; Vol. 17(2), pp. 238-46.

Figure 8A:
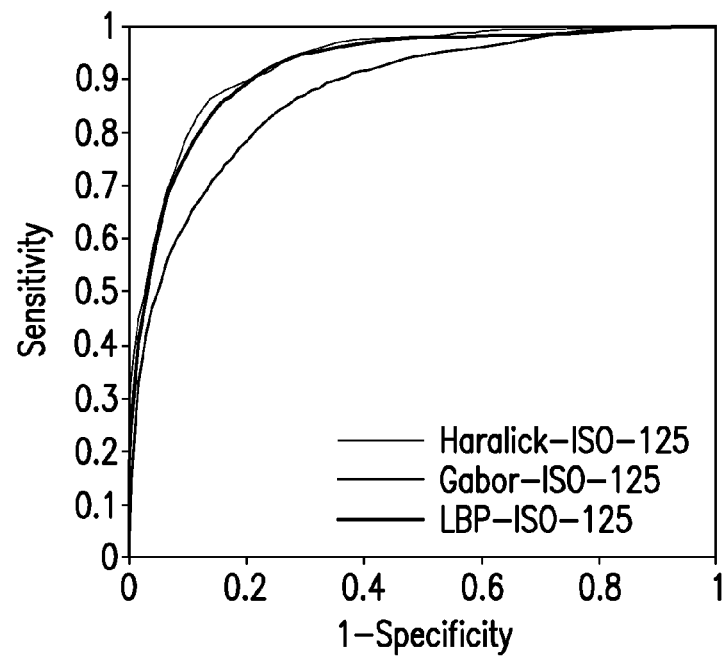
FIGS. 8($a$)-($c$) provide another set of ROC curves for texture features classification performances after thickness interpolation, according to an embodiment of the present invention.
Figure 8B:
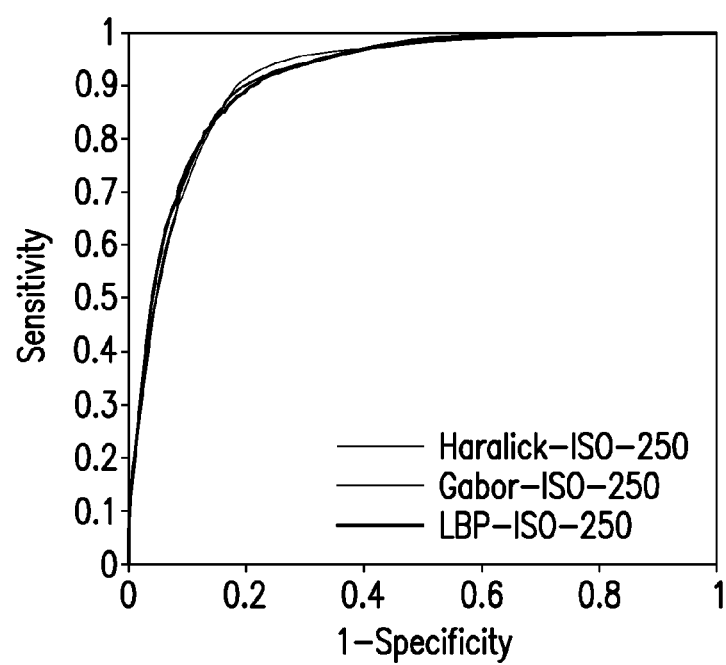
Figure 8C:
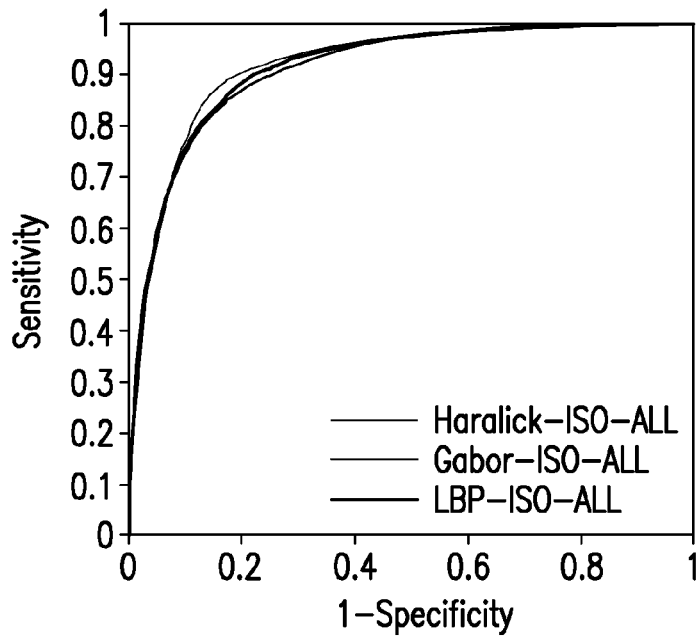

Because the pixel sizes in the cross-section CT images are all smaller than 1 mm, only those nodule volume data whose thicknesses are greater than 1 mm was interpolated, such as the Data_125 and Data_250. A total of 960 nodule datasets were interpolated into 1 mm slice thickness. The other 396 nodule datasets in Data_100 were remained. Then the three types of texture features were extracted from the interpolated and remained datasets, namely (axially) isotropic volume data. The extracted features were then compared by the same methods described above in regards to the initial experimental results. The averaged outcomes are plotted as ROC curves in FIGS. 8(*a*)-(*c*), which provide ROC curves of the three types of texture features' classification performances on the interpolated image data. FIG. 8(*a*) shows ROC curves from the interpolated 1 mm data from 1.25 mm thickness. FIG. 8(*b*) shows the ROC curves from the interpolated 1 mm data from 2.50 mm thickness. FIG. 8(*c*) shows the ROC curves from the combination of all the interpolated data and the original Data_100 datasets. Table 8 provides the AUC measures on different texture features from the three types of interpolated image data.

TABLE 8

| | AUC Information | | | | | |
|---|---|---|---|---|---|---|
| | Haralick Features | | Gabor Features | | LBP Features | |
| | Mean | SD | Mean | SD | Mean | SD |
| Data_125 (Interpolated) | 0.9256 | 0.0256 | 0.8699 | 0.0310 | 0.9166 | 0.0200 |
| Data_250 (Interpolated) | 0.9113 | 0.0179 | 0.9130 | 0.0149 | 0.9126 | 0.0126 |
| Data_100 + Data_125 (Interpolated) + Data_250 (Interpolated) | 0.9124 | 0.0120 | 0.9083 | 0.0099 | 0.9119 | 0.0096 |

Based on the results of FIGS. 7(*a*)-(*c*) and 8(*a*)-(*c*), as well as Tables 7-8, the following observations were documented. (1) The 2D Haralick texture features have higher mean values of the AUC measures on the isotropic data than the Gabor and LBP features (t-test p-value$_{HG}$=0.0100, p-value$_{HL}$=0.7901). (2) By comparing the classification results on the anisotropic and isotropic data, the interpolation did not show noticeable gain for both Haralick and Gabor features, however the t-test results showed some gain for the LBP features (p-value$_{HD125}$=0.6998, p-value$_{HD250}$=0.0452, p-value$_{GD125}$=0.0493, p-value$_{GD250}$=0.6434, p-value$_{LD125}$=0.0000, p-value$_{LD250}$=1.8905×10$^{-6}$). Based on the above two observations (more specifically on the improvement for LBP features' performance), the isotropic data were used in the next experiments, as discussed below, to further investigate the performances of the three types of texture features.

Figure 9A:
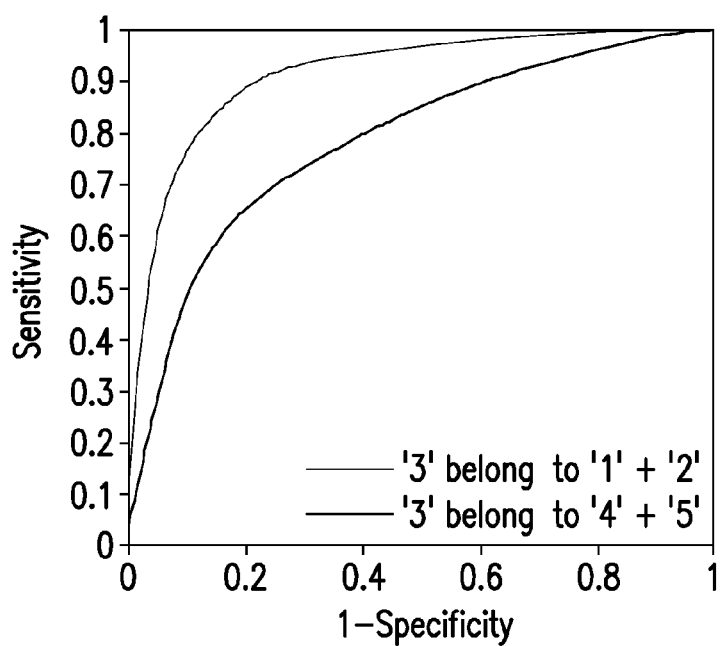
FIGS. 9($a$)-($c$) provide ROC curves of the three types of texture features' classification performances on two scenarios that group an uncertain label into a malignant class and into a benign class, respectively, according to an embodiment of the present invention.
Figure 9B:
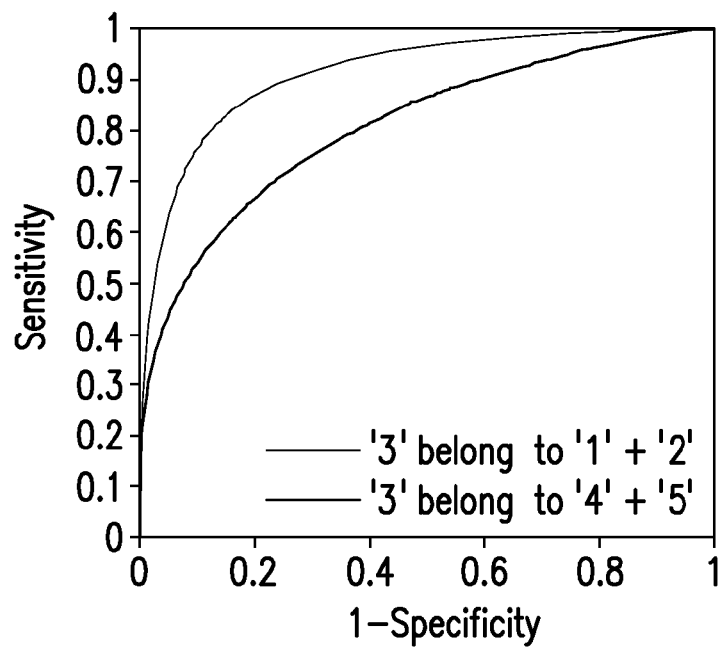
Figure 9C:
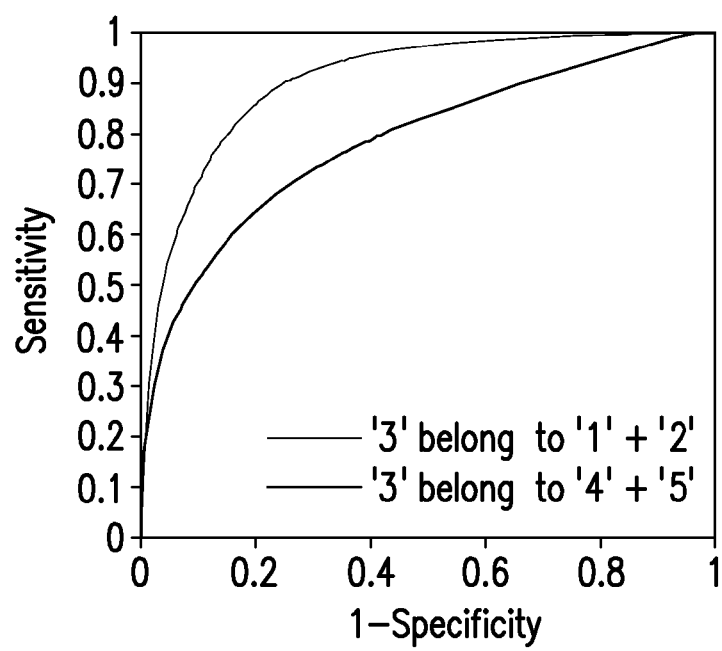

In regards to comparison of different experimental designs on the uncertain nodules, the above experiments were performed for the first scenario of grouping the uncertain label '3' into the benign class. The following experiment was performed for the second scenario of grouping the uncertain label '3' into the malignant class. The experiment was performed on the isotropic data as described above. The classification evaluation results of the second scenarios are described by the ROC curves as shown in FIGS. 9(a)-(c), where the results of the first scenario are also listed for comparison purpose in Table 9, which provides AUC measures on the three types of texture features from the two scenarios. FIGS. 9(a)-(c) provide ROC curves of the three types of texture features' classification performances on the two scenarios. FIG. 9(a) shows the ROC curves on the Haralick features from the two scenarios, FIG. 9(b) shows the ROC curves on the Gabor features from the two scenarios, and FIG. 9(c) shows the ROC curves on the LBP features from the two scenarios.

TABLE 9

| | AUC Information | | | | | |
|---|---|---|---|---|---|---|
| | Haralick Features | | Gabor Features | | LBP Features | |
| | Mean | SD | Mean | SD | Mean | SD |
| '3' belong to '1' + '2' | 0.9124 | 0.0121 | 0.9101 | 0.0112 | 0.9012 | 0.0097 |
| '3' belong to '4' + '5' | 0.7810 | 0.0266 | 0.8045 | 0.0212 | 0.7799 | 0.0127 |

Based on the evaluation experiments of the uncertain nodules with label '3', a conclusion was reached that the uncertain nodules are more similar to the benign ones according to the experts' visual assessment. These experimental outcomes from two different scenarios raise a suspicious that whether the experts' visual assessment might have bias toward classification for benign. Resolving this suspicious requires the ground truth from nodule biopsy, and unfortunately the ground truth is not available. Because of the advantage performance of the Haralick features over the other two types of features, the next research task investigated the gain obtained by expanding the Haralick model from 2D to 3D space.

In regards to comparison of 2D and 3D Haralick features, the extraction of 3D Haralick texture features as described above applies both 2D and 3D Haralick features to the CT volume images of 1,356 nodules from the LIDC database. All the CT image slice thicknesses were interpolated into 1 mm as unified isotropic data. The 2D Haralick texture features were calculated in two ways, with one calculation from a single slice with a largest area of nodules and another from all slices containing the nodules.

Figure 10A:
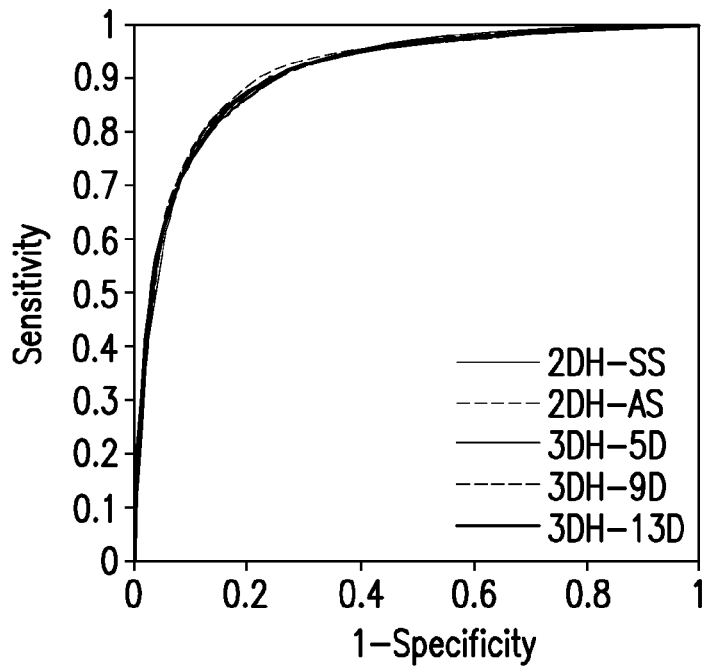
FIGS. 10($a$)-($b$) provide ROC curves of 2D and 3D Haralick texture features' classification performances from two experiments comparing 2D and 3D Haralick features, according to an embodiment of the present invention.
Figure 10B:
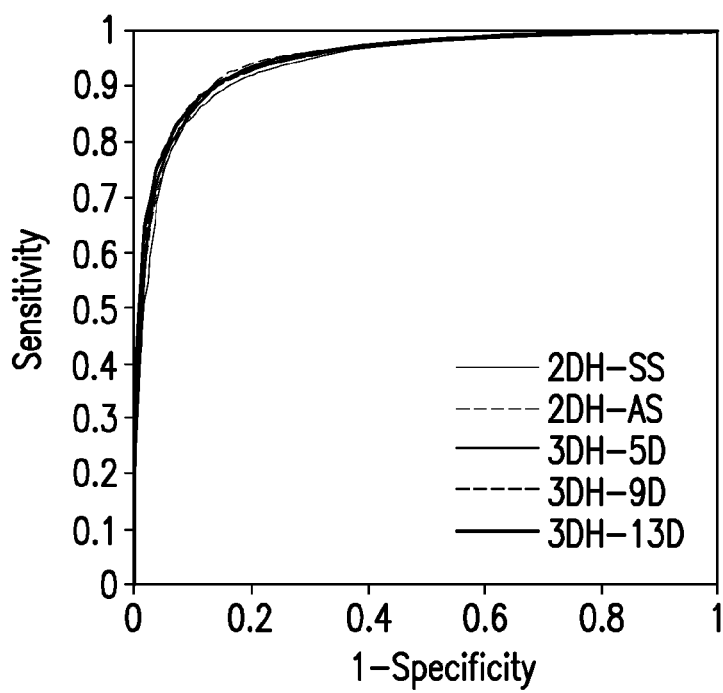

The 3D Haralick features were calculated in three ways, i.e., considering five directions, considering nine directions, and one considering all thirteen directions on the unified isotropic volume data of the nodules. The uncertain nodules with label '3' were considered as the benign ones in one experiment and excluded from the data as another experiment. The classification results of the 2D and 3D texture features from the two experiments are shown in FIGS. 10(a)-(b) and Table 10. The ROC curves from both experiments show similar characteristics, indicating that the results are not depending on the data variation. FIGS. 10(a)-(b) are graphs of ROC curves of the 2D and 3D Haralick texture features' classification performances from two experiments comparing 2D and 3D Haralick features, with FIG. 10(a) showing classification performances on the dataset containing the uncertain nodules, i.e., the nodules labeled by '3', and FIG. 10(b) showing classification performances on the dataset without the uncertain nodules.

Table 10 summarizes AUC measures for the performances of the 2D and 3D Haralick texture features from the two experiments.

TABLE 10

| | Mean | Standard D |
|---|---|---|
| AUC Information With Label '3' Nodules | | |
| 2D Haralick Features (Single slice) | 0.9113 | 0.0106 |
| 2D Haralick Features (All slices) | 0.9124 | 0.0121 |
| 3D Haralick Features (5 Directions) | 0.9069 | 0.0103 |
| 3D Haralick Features (9 Directions) | 0.9086 | 0.0124 |
| 3D Haralick Features (13 Directions) | 0.9080 | 0.0110 |
| AUC Information Without Label '3' Nodules | | |
| 2D Haralick Features (Single slice) | 0.9373 | 0.0103 |
| 2D Haralick Features (All slices) | 0.9432 | 0.0109 |
| 3D Haralick Features (5 Directions) | 0.9426 | 0.0088 |
| 3D Haralick Features (9 Directions) | 0.9440 | 0.0100 |
| 3D Haralick Features (13 Directions) | 0.9441 | 0.0088 |

Table 10 shows a gain for 2D features when applied to the 3D data as compared to the outcome from the single 2D image in both experiments. This is expected because more data information about the nodule is used. The gain by the 3D expansion is not seen in terms of AUC mean value from Table 10. To obtain further insight into the above observations from FIGS. 10(a)-(b) and Table 6, additional statistical tests were performed, as discussed below.

To determine statistical meaningfulness of the above observations, hypothesis t-test experiments were performed on the 2D and 3D Haralick features on the nodules image data with and without the uncertain nodules of label '3'. The p-values of the outcomes from the test experiments are shown in Tables 11 and 12. Table 11 summarizes T-test results of the 2D and 3D Haralick features on the data with the uncertain nodules, labeled by '3'. Table 12 summarizes T-test results of the 2D and 3D Haralick features on the data without the uncertain nodules, labeled by '3'.

TABLE 11

| | P-Value | | | | |
|---|---|---|---|---|---|
| | 2DH of Single Slice | 2DH of All Slices | 3DH of 5 Directions | 3DH of 9 Directions | 3DH of 13 Directions |
| 2DH of Single Slice | | 0.4972 | 0.0034 | 0.1103 | 0.0319 |
| 2DH of All Slices | 0.4972 | | $6.9789 \times 10^{-4}$ | 0.0336 | 0.0079 |
| 3DH of 5 Directions | 0.0034 | $6.9789 \times 10^{-4}$ | | 0.2752 | 0.4741 |
| 3DH of 9 Directions | 0.1103 | 0.0336 | 0.2752 | | 0.6807 |
| 3DH of 13 Directions | 0.0319 | 0.0079 | 0.4741 | 0.6807 | |

TABLE 12

| | P-Value | | | | |
|---|---|---|---|---|---|
| | 2DH of Single Slice | 2DH of All Slices | 3DH of 5 Directions | 3DH of 9 Directions | 3DH of 13 Directions |
| 2DH of Single Slice | | $1.0576 \times 10^{-4}$ | $1.3072 \times 10^{-4}$ | $5.9170 \times 10^{-6}$ | $2.4057 \times 10^{-6}$ |
| 2DH of All Slices | $1.0576 \times 10^{-4}$ | | 0.6528 | 0.6106 | 0.5253 |
| 3DH of 5 Directions | $1.3072 \times 10^{-4}$ | 0.6528 | | 0.3003 | 0.2352 |
| 3DH of 9 Directions | $5.9170 \times 10^{-6}$ | 0.6106 | 0.3003 | | 0.9019 |
| 3DH of 13 Directions | $2.4057 \times 10^{-6}$ | 0.5253 | 0.2352 | 0.9019 | |

Based on the t-test experimental results in Tables 11 and 12, as well as AUC measures in Table 10, the following three conclusions were documented.

As a first conclusion, the 2D Haralick features from the 3D data outperformed the 2D features from the 2D data (with the p value less than 0.05) in the absence of the uncertain nodules of label '3' (only the certain labels '1', '2', '4', and '5' were considered), and both performed similarly in the presence of the uncertain nodules (with the p value greater than 0.05). It is also worth including all the image slices of the 3D data to compute the 2D features because timely results are obtained utilizing computational power of a conventional desk top computer.

As a second conclusion, the 3D Haralick features performed slightly better than the 2D Haralick features in the absence of the uncertain nodules because three p values are less than 0.05 and the other three are greater than 0.05, and did not show gain in discrimination performance on the uncertain nodules because 5 in 6 p-values of 2D and 3D Haralick features are smaller than 0.05.

As a third conclusion, the 3D Haralick features from nine directions showed higher discrimination performance than five directions and did not show gain from thirteen directions regardless absence or presence of the uncertain nodules. Although the mean value of AUC of 3D Haralick features from thirteen directions is the highest (0.9441), it is only 0.0001 higher than the value of 3D Haralick features from 9 directions (0.9440) in the absence of the uncertain nodules and the t-test p-value is 0.9019>0.05, which means that they are not significantly different. This issue regarding consideration of more or less directions in computing the features seems somehow related to feature redundancy problem in general. In the following, an investigation of this redundancy problem is performed using the PCA. See, H. Abdi.

In regards to investigation of performance of dimension reduced 2D and 3D Haralick features, the above classification results determined that inclusion of the uncertain nodules (labeled '3') resulted in a noticeable variation in the texture characteristics in both the 2D and 3D space. To avoid such variation, the uncertain nodules were not included in the following study on feature redundancy problem, and, more generally, the study is of dimension reduction. Even upon exclusion of the uncertain nodules, there are still 906 nodules (422 malignant and 484 benign) with certain labels left for the dimension reduction study.

From each lung nodule CT image, a total 26 of 3D Haralick texture features were extracted from all the 13 directions. Similarly, a total 26 of 2D Haralick texture features were also extracted from the 4 directions. Given the numbers of the nodules and features, the resolution of the texture feature vector matrix is 906×26. Then the PCA was applied on the two matrices of 2D and 3D Haralick texture features, respectively. The cumulative energy contents of the ordered principal components were calculated from the eigenvalues which were ranged in descending order. The values were shown in Table 13, which summarizes cumulative energy content of the former PCs from 2D and 3D Haralick features.

TABLE 13

| | No. of PCs | | | | | | |
|---|---|---|---|---|---|---|---|
| | 1 | 2 | 3 | ... | 9 | ... | 26 |
| 2D Haralick Features (Single Slice) | 0.998511 | 0.999515 | 0.999863 | ... | 1.000000 | ... | 1.000000 |
| 3D Haralick Features (13 Directions) | 0.991478 | 0.997637 | 0.999096 | ... | 1.000000 | ... | 1.000000 |

Figure 11A:
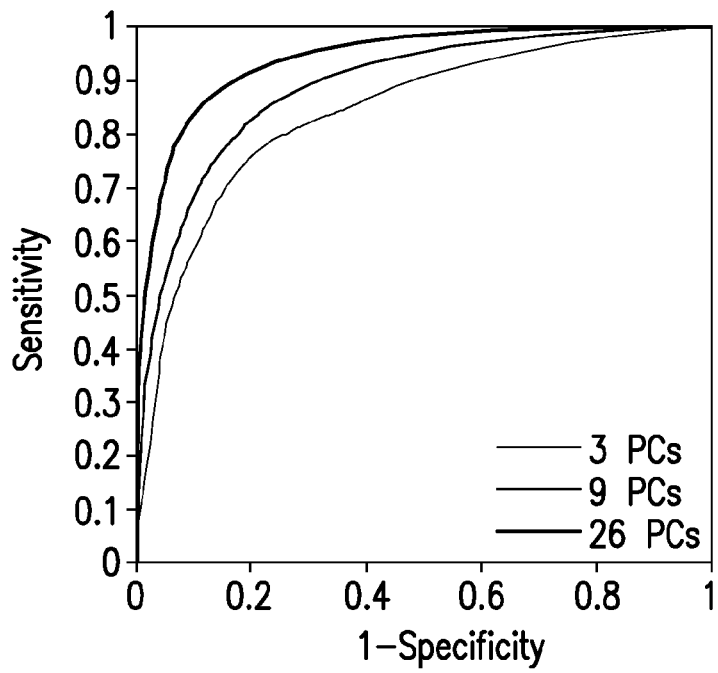
FIGS. 11($a$)-($b$) provide ROC curves of classification evaluations based on three, nine and twenty-six PCs extracted from the 2D and 3D Haralick features, according to an embodiment of the present invention.
Figure 11B:
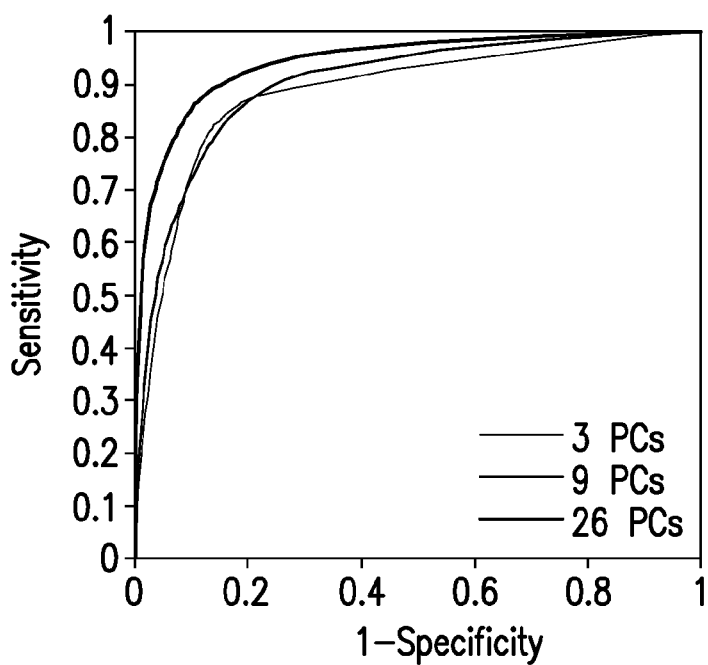

For three PCs, all cumulative energy contents are above 0.999000, as shown in Table 13. With nine PCs, all cumulative energy contents increase to 1.000000. The experiments also compare performances of the principal components of 2D vs. 3D Haralick features. The ROC curves and the AUC information of the above reduced features are shown in Table 14 and FIGS. 11(a)-(b). Table 14 summarizes AUC information about performances of 3 PCs, 9 PCs and 26 PCs after PCA analysis on the 2D and 3D Haralick features. FIGS. 11(a)-(b) provide ROC curves of the classification evaluations based on three, nine and twenty-six PCs extracted from the 2D and 3D Haralick features. FIG. 11(a) shows the different PCs from 2D Haralick features of single slices and FIG. 11(b) shows different PCs from 3D Haralick features of single slices.

TABLE 14

| | AUC Information | | | |
|---|---|---|---|---|
| | 2D Haralick Features (Single Slice) | | 3D Haralick Features (13 Directions) | |
| | Mean | Standard Deviation | Mean | Standard Deviation |
| 3 PCs | 0.8354 | 0.0151 | 0.8814 | 0.0131 |
| 9 PCs | 0.8849 | 0.0137 | 0.8978 | 0.0130 |
| 26 PCs | 0.9377 | 0.0095 | 0.9386 | 0.0093 |

The results from Table 14 and FIGS. 11(a)-(b) confirm that both 2D and 3D features performed similarly and their performances increased as additional PCs are used, indicating that the thirteen measures from each direction have no significant redundancy. Also, in view of the 3D expansion study discussed above, redundancy may exist only in the directions involving the z-axis, where two factors may be considered when selecting the directions, i.e., a factor of a data sampling rate when CT images are acquired and another factor of objects' geometry and texture properties along the z-axis. For the sampling rate at mm resolution level along the z-axis and the nodule sizes also at mm level, more than nine directions in the 3D expansion appears unnecessary.

FIG. 12 is a block diagram of upper level components of an apparatus for CADe or segmentation of pulmonary nodules, to output a detected nodule with a center location (x,y,z) and volume border outlines on the image slices. The upper level components include a preprocessor 1210, a candidate detector 1220 and a classifier 1240 that performs segmentation.

Figure 13:
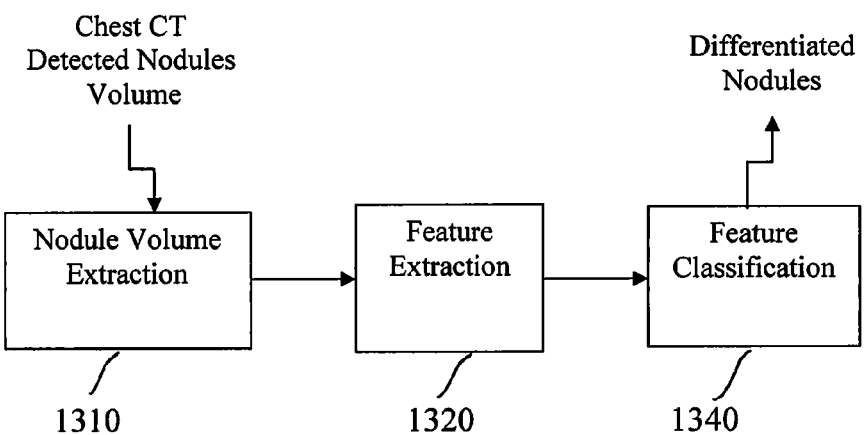
FIG. 13 is a block diagram of lower level components of the apparatus of the present invention for computer-aided diagnosis (CADx) or differentiation of detected pulmonary nodules, according to an embodiment of the present invention.

FIG. 13 is a block diagram of lower level components for CADx or differentiation of detected pulmonary nodules. The lower level components include a nodule volume extractor 1310, a feature extractor 1320, and a feature classifier 1340 that output, as an entire lung volume, an indication of malignant or benign of the detected nodule. The nodule volume extractor 1310 includes two alternatives. The first alternative is automated detection of nodules and segmentation of nodule volume border outlines, where the detection indicates that a nodule candidate is detected at a location, and segmentation indicates that the nodule volume border is outlined on image slices, with the automated procedure described in FIGS. 14-16. The second alternative is manual detection of nodules by a physician expert and manual segmentation of the nodule volume border by the expert. After manual detection and segmentation, extraction of the nodule volume from the manually drawn border outlines on the image slices is shown in FIG. 1. Feature extractor 1320 operation is outlined in FIGS. 2-5, with FIG. 6 illustrating information provided by a database to evaluate extracted intrinsic features of the detected and segmented nodules via feature classification operations.

Figure 14:
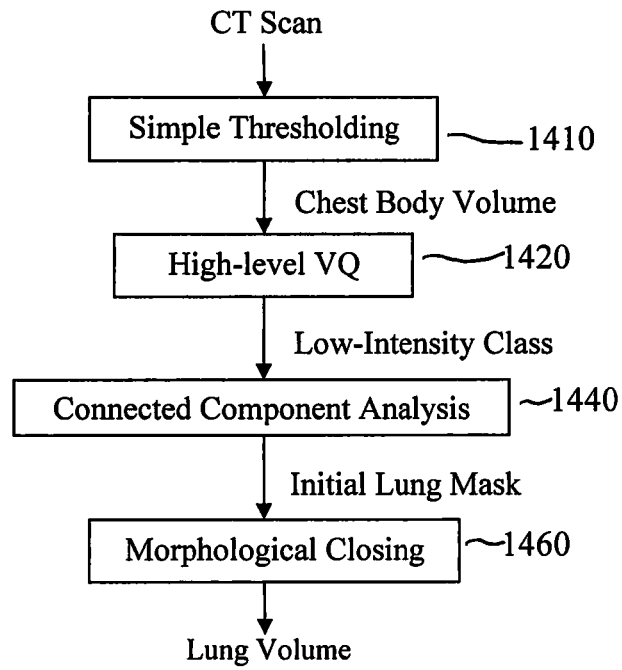
FIG. 14 is a flowchart of operation of a preprocessor of the apparatus of FIG. 12.

FIG. 14 is a flowchart summarizing operation of the preprocessor 1210 of FIG. 12. Simple thresholding is performed of a CT scan in step 1410, followed by high-level Vector Quantization (VQ) of a chest body volume step 1420. Connected component analysis is performed in step 1440, followed by morphological closing in step 1460, to output an entire lung volume.

Figure 15:
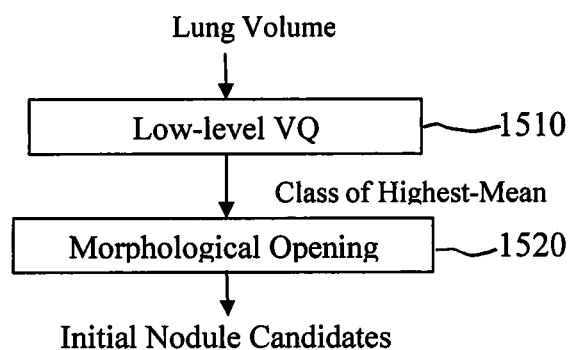
FIG. 15 is a flowchart of a candidate detector of the apparatus of FIG. 12.

FIG. 15 is a flowchart of the candidate detector 1220, with low-level VQ performed on the lung volume in step 1510, followed by morphological opening in step 1520 to output the initial detection of nodule candidates.

Figure 16:
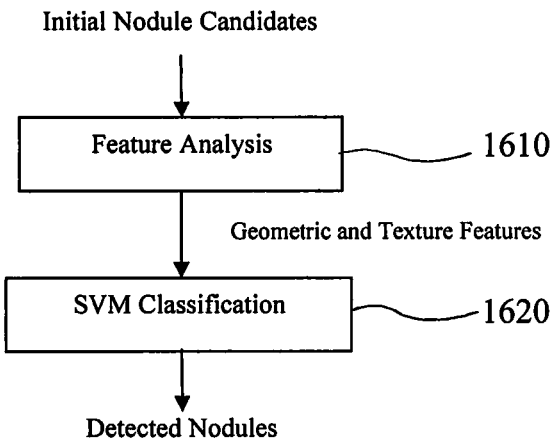
FIG. 16 is a flowchart of a classifier of the apparatus of FIG. 12.

FIG. 16 is a flowchart of operation of the classifier 1240, into which initial detection is input and feature analysis is performed in step 1610, followed by SVM classification performed in step 1620, to output detected nodules with respective locations and border outlines on the image slices, with the border outlines determined by image segmentation.

Figure 17:
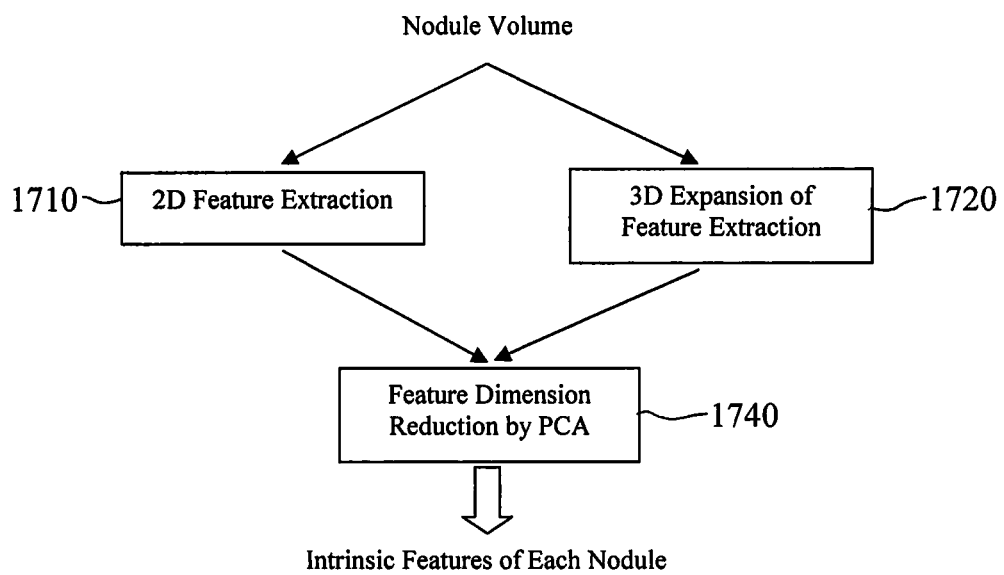
FIG. 17 is a flowchart of a feature extractor of the apparatus of FIG. 13.
Figure 18:
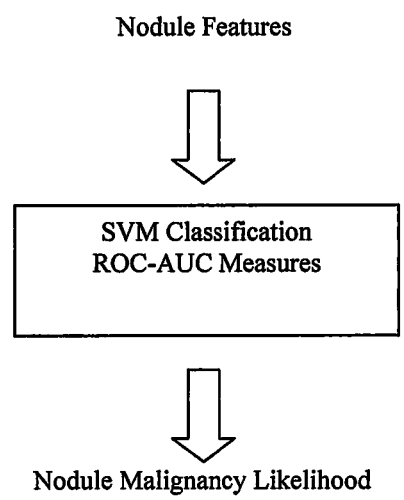
FIG. 18 is a flowchart of operation of a feature classifier of the apparatus of FIG. 13.

FIG. 17 is a flowchart showing operation of feature extractor 1320 (FIG. 13), which performs 2D feature extraction in step 1710 and 3D expansion of feature extraction in step 1720, with the 2D feature extraction and 3D expansion input into step 1740 for feature dimension reduction by PCA. FIG. 18 is a flowchart showing operation of feature classifier 1340 (FIG. 13), which obtains nodule features, performs classification by Support Vector Machine (SVM) of ROC-AUC measures, and outputs nodule malignancy likelihood.

Advantages of the present inventive technology include providing an apparatus and method to detect anomalous pulmonary nodules by obtaining a 2D feature model of a pulmonary nodule, segmenting the pulmonary nodule by performing vector quantification to expand the 2D feature model to a three-dimensional 3D model, and displaying image information representing whether the pulmonary nodule is benign, based upon the 3D model expanded from the 2D feature model, with duplicate information eliminated by performing feature reduction performed using a principal component analysis and an ROC area under the curve merit analysis. A textural feature analysis detects an anomalous pulmonary nodule, and 2D texture features are calculated from 3D volumetric data to provide improved gain compared to calculation from a single slice of 3D data.

In the preferred aspects, a system and method are provided for utilizing adaptive computer-aided detection of pulmonary nodules in thoracic Computed Tomography images using hierarchical vector quantization and an apparatus for same. While in preferred embodiments, the methods are carried out in an automated format, entirely within the computer processor, it should be understood that one or more components may be carried out by a human and that the methods may involve human interaction or intervention at one or more points.

The computer processor for conducting aspects of the methods of the present invention may be housed in devices that include desktop computers, scientific instruments, hand-held devices, personal digital assistants, phones, a non-transitory computer readable medium, and the like. The methods need not be carried out on a single processor. For example, one or more steps may be conducted on a first processor, while other steps are conducted on a second processor. The processors may be located in the same physical space or may be located distantly. In certain embodiments, multiple processors are linked over an electronic communications network, such as the Internet. Preferred embodiments include processors associated with a display device for showing the results of the methods to a user or users, outputting results as a video image that includes feeder outlines or motifs. The processors may be directly or indirectly associated with information databases. As used herein, the terms processor, central processing unit, and CPU are used interchangeably and refer to a device that is able to read a program from a computer memory, e.g., ROM or other computer memory, and perform a set of steps according to the program. The terms computer memory and computer memory device refer to any storage media readable by a computer processor. Examples of computer memory include, but are not limited to, RAM, ROM, computer chips, digital video discs, compact discs, hard disk drives and magnetic tape. Also, computer readable medium refers to any device or system for storing and providing information, e.g., data and instructions, to a computer processor, DVDs, CDs, hard disk drives, magnetic tape and servers for streaming media over networks. As used herein, encode refers to the process of converting one type of information or signal into a different type of information or signal to, for example, facilitate the transmission and/or interpretability of the information or signal. For example, image files can be converted into, i.e., encoded into, electrical or digital information.

While the invention has been shown and described with reference to certain aspects thereof, it will be understood by those skilled in the art that various changes in form and details may be made therein without departing from the spirit and scope of the present invention as defined by the appended claims and equivalents thereof.

What is claimed:

1. A method for detecting anomalous pulmonary nodules, the method comprising:
   obtaining a two-dimensional (2D) feature model of a pulmonary nodule;
   segmenting the pulmonary nodule by performing vector quantification to expand the 2D feature model to a three-dimensional (3D) model; and
   displaying, on a display, image information representing whether the pulmonary nodule is benign, based upon the 3D model expanded from the 2D feature model.

2. The method of claim 1, further comprising performing feature reduction.

3. The method of claim 2, wherein the feature reduction eliminates duplicate information.

4. The method of claim 3, wherein the feature reduction is performed using a Principal Component Analysis.

5. The method of claim 3, wherein the feature reduction is performed using a receiver operating characteristic area under curve merit analysis.

6. The method of claim 1, further comprising performing a textural feature analysis to detect an anomalous pulmonary nodule.

7. The method of claim 6, further comprising calculating 2D texture features from 3D volumetric data to provide improved gain.

8. An apparatus for detecting anomalous pulmonary nodules, the apparatus comprising:
   a controller configured to obtain a two-dimensional (2D) feature model of a pulmonary nodule, to segment the pulmonary nodule by performing vector quantification to expand the 2D feature model to a three-dimensional (3D) model, and to display image information representing whether the pulmonary nodule is benign, based upon the 3D model expanded from the 2D feature model.

9. The apparatus of claim 8, wherein the controller is further configured to eliminate duplicate information by performing feature reduction.

10. The apparatus of claim 9, wherein the feature reduction is performed using a Principal Component Analysis.

11. The apparatus of claim 9, wherein the feature reduction is performed using a receiver operating characteristic area under the curve merit analysis.

12. The apparatus of claim 8, wherein the controller is further configured to perform a textural feature analysis to detect an anomalous pulmonary nodule.

13. The apparatus of claim 8, wherein calculating 2D texture features from 3D volumetric data provides improved gain.

* * * * *